US006436197B1

(12) United States Patent
Sapienza et al.

(10) Patent No.: US 6,436,197 B1
(45) Date of Patent: Aug. 20, 2002

(54) OPTICAL MEDIA DEMETALLIZATION PROCESS

(75) Inventors: Richard Sapienza, Shoreham, NY (US); Kenneth J. Heater; R. Mark Hodge, both of Westerville, OH (US); Joshua R. Michaels, Worthington, OH (US); J. Michael Grubb, Westerville, OH (US)

(73) Assignee: METSS Corporation, Columbus, OH (US)

( * ) Notice: Subject to any disclaimer, the term of this patent is extended or adjusted under 35 U.S.C. 154(b) by 13 days.

(21) Appl. No.: 09/655,013

(22) Filed: Sep. 5, 2000

(51) Int. Cl.⁷ .......................... B08B 7/00; B29B 17/00; C08J 11/00
(52) U.S. Cl. .................. 134/16; 134/6; 134/28; 134/33; 521/40; 521/48
(58) Field of Search .................. 134/3, 10, 16, 134/26, 28, 31, 32, 33; 521/40, 48

(56) References Cited

U.S. PATENT DOCUMENTS

| 3,070,553 | A | | 12/1962 | Nagle et al. | |
|---|---|---|---|---|---|
| 3,098,046 | A | | 7/1963 | Siggel et al. | |
| 3,565,852 | A | | 2/1971 | Conix et al. | |
| 3,652,466 | A | | 3/1972 | Hittel et al. | |
| 4,118,346 | A | | 10/1978 | Summers | |
| 4,143,001 | A | | 3/1979 | Raab et al. | |
| 4,212,774 | A | | 7/1980 | Idel | |
| 4,602,046 | A | | 7/1986 | Buser et al. | |
| 5,151,452 | A | | 9/1992 | Fennhoff et al. | |
| 5,306,349 | A | | 4/1994 | Nee | |
| 5,352,329 | A | * | 10/1994 | Herbert et al. | 156/646 |
| 5,464,877 | A | | 11/1995 | Franci | |
| 5,691,290 | A | * | 11/1997 | Vonk et al. | 510/212 |
| 5,817,183 | A | | 10/1998 | Eddy-Helenek | |
| 5,962,383 | A | * | 10/1999 | Doyel et al. | 510/164 |
| 6,066,229 | A | * | 5/2000 | Komine et al. | 156/344 |
| 6,262,133 | B1 | * | 7/2001 | Wisner | 521/40 |

FOREIGN PATENT DOCUMENTS

| DE | 2814908 | 1/1979 |
|---|---|---|
| EP | 0601719 | 6/1994 |

* cited by examiner

Primary Examiner—Randy Gulakowski
Assistant Examiner—Saeed Chaudhry
(74) Attorney, Agent, or Firm—Hedman & Costigan, P.C.

(57) ABSTRACT

A process for removing the coating and any metals from polymeric substrates such as compact discs (CDs) and digital video discs (DVDs) by applying high shear conditions to fluidized particulates of the polymeric substrate optionally in the presence of an accelerant.

28 Claims, No Drawings

OPTICAL MEDIA DEMETALLIZATION PROCESS

FIELD OF THE INVENTION

The present invention relates to removal of coatings (metallic, organic and/or inorganic based) from polymeric substrates. More particularly, the present invention relates to an optical media demetallization process. Most particularly the present invention relates to demetallizing optical media with high shear in the presence of an aqueous media. In a particularly preferred embodiment the present invention relates to demetallizing optical media in the presence of an organic acid at high shear conditions. The present invention also has application in removing lacquers and/or metals from a variety of other products, including, but not limited to, headlamp lenses or automotive trim components.

BACKGROUND OF THE INVENTION

Polymeric substrates are often used in a variety of applications in which a coating is applied to protect the underlying polymeric substrate while preserving optical clarity and/or improving impact resistance. Polymeric substrates are also known to be coated for decorative purposes, such as paints, and to impart a variety of other functional properties on the substrate. For example, polycarbonate sheets are often dipped into a silicone hardcoat solution, dried and then cured by known methods. Additional protective coatings commonly used on polycarbonate articles are acrylic hardcoats and hard coats based on formaldehyde-melamine resins. Other polymeric materials besides polycarbonates are known to be similarly coated such as a polymethacrylate sheet initially treated with a thermoset acrylic primer followed by the application of a silicone hardcoat.

Polycarbonates used for optical media, such as compact discs (CDs) and/or digital video discs (DVDs) present a particular problem. CDs are metallized with aluminum and then surface sealed with lacquers which may optionally be printed on. DVD halves are metallized with gold and aluminum, respectively. An adhesive is then used to bond the two halves together. The DVD is then optionally coated with an acrylic or lacquer and optionally printing is further applied thereon.

Polymeric material end users and manufacturers such as found in the polycarbonate industry have been faced with increasing environmental concerns due to the proliferation of CDs and DVDs which are becoming more and more commonplace in everyday life. The use of metals on the surfaces of these items raises significant environmental problems with their disposal. The lack of a suitable means for demetallizing the surfaces in an environmentally friendly manner have rendered the CDs and DVDs difficult to recycle. Thus landfilling has typically become the choice disposal method, which has significant environmental problems.

Current processes for the demetallization of optical media typically involve the use of a caustic solution such as sodium hydroxide. See for example, Eddy-Helenek et al., U.S. Pat. No. 5,817,183; Nee, U.S. Pat. No. 5,306,349; and Franci, U.S. Pat. No. 5,464,877. Although these processes have been shown to have some effect at demetallization, the caustic solution may cause appreciable damage to the polycarbonate polymer substrate by decreasing the molecular weight of the polycarbonate. There are additional environmental and OSHA issues associated with the use of caustic solutions on polycarbonates. One of these issues is the possible generation of bisphenol A monomer in the effluent process streams.

Mention is also made of Fennhoff et al., U.S. Pat. No. 5,151,452, which disclosed using acid media at reflux temperature and low shear conditions. Although this process would have some beneficial effect at demetallizing CDs the failure to recognize the need for high shear conditions to effect demetallization of the gold in DVDs renders this process ineffective in many applications. Furthermore, the lacquer removal process of Fennhoff et al. '452 is clearly dependent on chemical interaction between the acids and the target materials and thus fails to even remotely suggest the lacquer/metal removal by the high shear mechanical methods of the present invention.

Thus, it would represent a notable advance in the state of the art if a relatively environmentally benign process for removing coatings (optionally including metals) from a wide variety of metal surface treated polymeric scrap materials were developed.

SUMMARY OF THE INVENTION

Accordingly, the present invention provides an improved coating removal process which processes the polymeric substrate by flaking the polymeric substrate, intimately mixing the polymeric flakes at fluidized and relatively high shear conditions in order to effect the removal of the coating and any metal(s), adhesive and coating layers from the polymeric substrate, thereby creating a cleaned, undamaged polymeric flake suitable for recycling and allowing for recovery of the removed metals from the effluent through filtration or other separation or extraction techniques known to those of ordinary skill in the art. Optionally, the shearing may take place in the presence of a chemical accelerant such as one or more carboxylic acid esters, carboxylic acids or mixtures thereof.

In the case of DVDs, the present invention surprisingly also provides an effective process for recovering valuable gold content from the DVDs. Accordingly, the process of the present invention may also be performed in a closed-loop configuration to reduce environmental effects in which the release of fumes and effluent is kept relatively low and any active chemicals are conserved.

In one embodiment of the present invention there is provided a process for cleaning a polymeric substrate having a coating thereon, the process comprising the steps of: (a) mechanically flaking or granulating the polymeric substrate into relatively small particles; (b) delivering the particles of polymeric substrate to a mechanical shearing apparatus; (c) fluidizing the polymeric substrate particles; (d) shearing the fluidized particles at a relatively high rate of shear, optionally in the presence of an accelerant selected from the group consisting of carboxylic acids, carboxylic acid esters and mixtures thereof, to clean the polymeric substrate; and (e) recovering the cleaned polymeric particles. In especially preferred embodiments of the present invention, the coating on the polymeric particles includes a metallic substance, and the process of the present invention substantially completely demetallizes the polymeric particles, i.e., down to 20 ppmw of metal or less.

DETAILED DESCRIPTION OF THE PRESENT INVENTION

The present invention provides a process for removing a coating from a coated polymeric substrate, the process comprising the steps of: (a) fragmenting the polymeric substrate into relatively small polymeric substrate particles; (b) delivering the particles of polymeric substrate to a mechanical shearing apparatus; (c) fluidizing the polymeric substrate particles; (d) shearing the particles at a relatively high rate of shear, optionally in the presence of an accelerant selected from the group consisting of carboxylic acids, carboxylic acid esters and mixtures thereof, to remove the coating from the polymeric substrate; and (e) recovering the cleaned polymeric particles.

Although polycarbonate substrates such as compact discs are used illustratively throughout the present specification, it is to be understood that the process of the present invention has application to a wide variety of polymeric substrates which have been surface coated, optionally where the surface coating also includes metals. For example the method of the present invention can also be used to clean aromatic polyester carbonates which accumulate in the production of lenses for spectacles or other optical applications, or lamp or headlight reflectors.

The polymeric substrate is first reduced into particles, fragments, flakes, granules, chips and the like by means well known to those of ordinary skill in the art. For example, the polymeric material may be cut or chopped, chipped, shredded, granulated, flaked, crushed or ground into relatively small individual particulates. The flaking assists in enhancing the flow characteristics and also increases the number of edge and corner sites per unit area of flake, thereby further enhancing the intensity of the particle-particle interactions and improving shearing efficiency. There is no requirement that the particulates have a regular size and shape, and in a preferred embodiment the particulates are of irregular shape and comprise particulates ranging in size from about 2 to about 20 millimeters, preferably from about 4 to about 10 millimeters, in the longest direction. The particulates can consist of DVD, CD or other plastic substrates, alone or mixed with one another.

The particulates are then delivered to a mechanical shearing apparatus and fluidized. The coating removal and/or demetallization effects of the fluidized particulates are significantly enhanced through the use of high intensity shear mixing, which promotes slurry turbulence and increases the particle-particle interaction, and/or particle-mixing blade interactions and/or interactions between the particles and any solid fixtures (walls, fittings and the like) in the shearing vessel. Excellent results can be reproduced in almost any industrial equipment that facilitates high shear mixing.

For example, a high speed rotary blade industrial mixer, with blade speeds of greater than about 500 rpm, preferably greater than about 800 rpm, more preferably greater than about 1000 rpm and most preferably greater than about 1250 rpm would be suitable for use in the practice of the present invention. The blade tip speed in the mixers should be relatively high as well, on the order of at least about 10 m/s, preferably at least about 15 m/s, and most preferably at least about 18 m/s. The mill may also be designed to enhance shearing interaction by use of an appropriate impeller design, i.e., number, geometry, diameter, and placement; an appropriate vessel design, i.e., to reduce time in dead zones; and other design factors, i.e., presence and design of a sweep cage. Attrition mills without attrition media are suitable for use as a mechanical shearing apparatus in accordance with the invention.

The means of fluidization of the particulates in the mechanical shearing apparatus can be air, such as from a blower, water or other liquid systems. Water is especially preferred.

In the mechanical shearing apparatus, the polymeric substrate chips may also be contacted with an accelerant. The accelerants useful in the practice of the present invention comprise carboxylic acids, carboxylic acid esters and mixtures thereof. While excellent results are obtained using water alone, i.e., with no accelerant, the use of accelerants such as aqueous carboxylic acids or carboxylic acid esters may reduce the time of shearing and/or shearing temperature required to effect delamination and/or demetallization. In those cases, the concentration of acid or ester is preferably in the range of from about 0.1 to 20 weight percent, more preferably from about 0.1 to about 10 weight percent, and most preferably from about 0.25 to about 1 weight percent.

Other materials may also be added with the accelerant such as conventional surfactants, soaps and salts where desired to assist in the cleaning of the polymeric substrate particles.

The carboxylic acids useful in the practice of the present invention include all those known to persons of ordinary skill in the art. Especially preferred is acetic acid. The acetic acid is believed to also act to embrittle the adhesive on the DVD flake thereby enhancing the effectiveness of the high shear process, although the inventors do not wish to be bound to any particular theory. Further, the acetic acid is also believed to prevent metal or coating particulates from re-depositing on the polymeric flake substrate, maybe due to charge dissipation or surfactant properties, although again the inventors do not wish to be bound by any particular theory. Likewise any of the known carboxylic acid esters may be employed in the practice of the present invention, although the lactates, such as ethyl lactate, are preferred.

In loading the thermoplastic substrate chips and the accelerant into the mechanical shearing apparatus, the solids content in the fluidizing medium should be as high as practicable, such as about 60%, in order to achieve the best results, as long as fluid assisted mixing of the chips is maintained. In preferred embodiments the solids content ranges from about 20 to about 60%. Higher solids contents are possible depending on the equipment, flake size and thickness but difficulties in materials handling (pumping) and mixing behavior may lead to process inefficiencies.

The temperature of the mixture in the mechanical shearing apparatus should be kept below the reflux temperature for the particular conditions employed during the shearing process. A shearing temperature in the range of from about 50° to about 95° C. is preferred, more preferably from about 60° to about 95° C., and most preferably from about 80 to about 95° C. Heat does not generally need to be added as the high shearing typically generates sufficient heat. In fact in some instances a cooling jacket on the mixing apparatus may be required to keep the temperature from rising too high. Thus, the shearing portion of the process of the present invention may be commenced at room temperature and a desired elevated shearing temperature may be attained by friction alone. Alternatively, it is contemplated to preheat the mixture in the shearing apparatus to a desired preheat temperature, such as from about 50 to about 70° C., or even up to the desired shearing temperature.

The fluidized particulates are sheared at these relatively high shear conditions until coating removal and optionally demetallization is complete, typically in the range of from about 0.5 to about 3.0 hours, preferably from about 1.0 to 2 hours. The time of shearing is dependent upon the amount and type of accelerant (if used), the solids content, the shearing rate, the temperature, and the flake size and thickness.

It has been noted by the inventors that the combined effect of solids content and rate of shear exhibit a synergy in that the combined effect of these two parameters is greater than the additive effect of each parameter individually. In assays of various optical media for metals content before and after processing in accordance with the present invention, aluminum content has consistently been reduced from 90–100 ppmw to about 6–9 ppmw. Similarly, gold has consistently reduced from greater than 150 ppmw to less than about 20 ppmw.

After coating removal and optional demetallization is completed, the cleaned polymeric substrate is recovered by washing, filtering and/or drying processes in conventional apparatus as are well known to those skilled in the art. The recovered thermoplastic particles are cleaned of metals, adhesives, pigments, dyes and other coatings in an undamaged state, suitable for recycling and reuse in molding operations. In the washing stages, it is contemplated that the wash may include a washing additive such as organic acids (including acetic acid) or other conventional surface active agents (soaps) in order to enhance the cleanliness of the CD and/or DVD flake, where needed or desired.

The effluent from the filtering step can be further treated to recover metals through filtration or other separation or extraction techniques known to those of ordinary skill in the art. In the case of DVDs the present invention surprisingly also provides an effective process for recovering valuable gold content from the DVDs.

It is also contemplated by the present invention that the process of the present invention may be also be performed in a closed-loop configuration to reduce environmental effects in which the release of fumes and effluent is kept relatively low and any active chemicals are conserved. In this type of embodiment the filtration effluent is cleaned of metals and other contaminants by filtration and other separation processes known to those skilled in the art and is recycled to the shearing step for reuse as accelerant.

DESCRIPTION OF THE PREFERRED EMBODIMENTS

The following examples are provided for illustrative purposes and are not to be construed to limit the scope of the claims in any manner whatsoever.

EXAMPLE 1

A slurry of 60% flaked compact disks (2220 g) and 40% solution of 20% acetic acid (1184 g water/296 g acetic acid) was placed in an attrition mill operating at 1025 rpm at room temperature with no attrition media. After 2 hours the mill warmed to 53° C. After two hours there was 100% delamination and demetallization.

EXAMPLE 2

A slurry of 60% of flaked digital video disc (2220 g) and 40% solution of 20% acetic acid (1184 g water/296 g acetic acid) was placed in an attrition mill operating at 1025 rpm at room temperature with no attrition media. After 2 hours the mill warmed to 58° C. and the DVD polycarbonate was 100% demetallized and appeared very clean although a faint residual gold existed.

EXAMPLE 3

A slurry of 60% flaked compact disks (2220 g) and 40% solution of 20% acetic acid (1184 g water/296 g acetic acid) was placed in an attrition mill operating at 1025 rpm at room temperature with no attrition media. Also added was 1% (14.8 g) of NaCl solution. At 30 minutes there was less than 50% delamination. After 60 minutes there was 80–90% delamination. After 90 minutes there was 95–99% delamination. After 2 hours the mill warmed to 53° C. and there was 100% delamination and demetallization.

EXAMPLE 4

A slurry of 60% flaked compact disks (2220 g) and 40% solution of 20% acetic acid (1184 g water/296 g acetic acid) was placed in an attrition mill operating at 1025 rpm at room temperature with no attrition media. Also added was 3% (44.4 g) of NaCl solution. At 30 minutes there was less than 50% delamination. After 60 minutes there was 80–90% delamination. After 90 minutes there was 95–99% delamination. After 2 hours the mill warmed to 53° C. and there was 100% delamination and demetallization. The yield appeared slightly more clear than the 1% NaCl experiment (Example 3) at 2 hours.

EXAMPLE 5

A slurry of 60% flaked compact disks (2220 g) and 40% solution of 10% acetic acid (1332 g water/148 g acetic acid) was placed in an attrition mill operating at 1025 rpm at room temperature with no attrition media. After 2 hours the mill warmed to 51° C. and there was 95% delamination and demetallization.

EXAMPLE 6

A slurry of 60% flaked compact disks (2220 g) and 40% solution of 15% acetic acid (1258 g water/222 g acetic acid) was placed in an attrition mill operating at 1025 rpm at room temperature with no attrition media. After 2 hours the mill warmed to 49° C. and there was 100% delamination and demetallization.

EXAMPLE 7

A slurry of 60% flaked compact disks (150 kg) and 40% solution of 1% acetic acid (10 kg) was placed in a 250 liter high speed industrial dispersion mixer operating at 1350 rpm at room temperature. After 2.75 hours the mill warmed to 93° C. and there was 100% delamination.

EXAMPLE 8

A slurry of 53% flaked digital video disks (125 kg) and 47% solution of 1% acetic acid (110 kg) was placed in a 250 liter high speed industrial dispersion mixer operating initially at 800 rpm to facilitate "wetting out" of the flake. The liquids were introduced at 60° C. After approximately 10 minutes, the flake was wetted out and the mixer speed was increased to 1350 rpm. After 3 hours, the mill warmed to 90° C. and there was majority (70–80%) delamination and demetallization.

EXAMPLE 9

A slurry of 12% flaked compact disks (5 kg), 48% flaked digital video disks (20 kg) and 40% solution of 1% acetic acid (17 kg) was placed in a 50 liter high speed industrial dispersion mixer operating at 1600 rpm. The liquids were introduced at 60° C. The temperature rose to 94° C. after 30 minutes. Complete demetallization was observed within 90 minutes.

EXAMPLE 10

A slurry of 60% flaked digital video disks (127 kg) and 40% solution of 1% acetic acid (84.5 kg) was placed in a 250 liter high speed dispersion mixer at room temperature operating at between 1350 rpm and 1600 rpm. After approximately 4 hours the temperature had risen to 92° C. Initially, more solution was added to enhance fluidity and promote slurry mixing (reducing the total solids content to around 45%). After the temperature had reached 60° C., this extra fluid was drained away. The flake was almost fully demetallized after 4 hours, with residual metal remaining on the larger flakes and 100% demetalization and delamination evident in the smaller flakes.

EXAMPLE 11

A slurry of 60% flaked digital video disks (26 kg) and 40% water (17 kg) was placed in a 50 liter high speed dispersion mixer at room temperature, operating at 2000 rpm. After 5 hours, batch temperature had risen to 98° C. with partial (80–90%) demetallization and delimination evident overall. Residual metal remained on the larger flakes, with 100% demetallization and delamination evident in the smaller flakes.

Many variations of the present invention will suggest themselves to those skilled in the art in light of the above-detailed description. All such obvious modifications are within the full intended scope of the appended claims.

The above-identified patents are hereby incorporated by reference in their entirety.

What is claimed is:

1. A process for removing a coating from a polymeric substrate having a coating thereon, said process comprising the steps of:
   (a) fragmenting said polymeric substrate into relatively small polymeric substrate particles;
   (b) delivering said polymeric substrate particles and a fluidizing medium comprising water at a polymeric substrate solids content ranging from about 50 to about 60 percent to a mechanical shearing apparatus equipped with a rotary blade;
   (c) fluidizing said polymeric substrate particles in said mechanical shearing apparatus;
   (d) shearing said fluidized particles at a relatively high rate of shear comprising a blade speed of greater than about 800 rpm and a blade tip speed of at least about 10 m/s and by causing particle-particle interaction, particle-mixing blade interaction and particle-solid fixture interaction to substantially remove the coating from the polymeric substrate; and
   (e) recovering cleaned polymeric particles.

2. A process as defined in claim 1 wherein said polymeric substrate particles are fluidized with fluidizing medium selected from the group consisting of air and water.

3. A process as defined in claim 2 wherein said fluidizing medium comprises water.

4. A process as defined in claim 3 wherein said polymeric substrate particles are present in said mechanical shearing apparatus at a solids content ranging from about 10 to about 60 weight percent solids.

5. A process as defined in claim 1 wherein said polymeric substrate comprises a polycarbonate.

6. A process as defined in claim 5 wherein said polycarbonate substrate comprises an optical media.

7. A process as defined in claim 6 wherein said optical media comprises compact disk, digital video disk or mixtures thereof.

8. A process as defined in claim 6 further comprising the step of recovering gold from said optical media.

9. A process as defined in claim 5 further comprising the step of recovering aluminum removed from said optical media.

10. A process as defined in claim 1 wherein said polymeric substrate particles comprise particles ranging in size from about 2 to about 20 millimeters in the longest direction.

11. A process as defined in claim 1 wherein an accelerant selected from the group consisting of carboxylic acids, carboxylic acid esters and mixtures thereof are further added to said shearing process.

12. A process as defined in claim 11 wherein said accelerant comprises aqueous acetic acid.

13. A process as defined in claim 12 wherein said acetic acid is present in a concentration ranging from about 0.1% to about 20% by weight based on the weight of the aqueous acetic acid.

14. A process as defined in claim 13 wherein the concentration of acetic acid ranges from about 0.1 to about 10 weight percent.

15. A process as defined in claim 14 wherein the concentration of acetic acid ranges from about 0.25 to 1 weight percent.

16. A process as defined in claim 11 wherein said accelerant comprises a lactate.

17. A process as defined in claim 16 wherein said shearing step (d) is conducted at a temperature of less than about 95° C.

18. A process as defined in claim 17 wherein said shearing step (d) temperature ranges from about 50 to about 95° C.

19. A process as defined in claim 1 wherein said shearing apparatus comprises a rotary blade mixer operating at a mixing speed of at least about 1000 rpm.

20. A process as defined in claim 1 wherein step (d) comprises washing said sheared polymeric particles.

21. A process as defined in claim 20 wherein said washing step comprises water washing.

22. A process as defined in claim 21 wherein said washing step comprising water washing in the presence of an organic acid, a surfactant or a mixture thereof.

23. A process for demetallizing and removing a coating from an optical media polymeric substrate, said process comprising the steps of:
   (a) fragmenting said polymeric substrate into relatively small polymeric substrate particles;
   (b) delivering said polymeric substrate particles and a fluidizing medium comprising water and an optionally an accelerant at a polymeric substrate solids content ranging from about 50 to about 60 percent to a mechanical shearing apparatus equipped with a rotary blade;
   (c) fluidizing said polymeric substrate particles in said mechanical shearing apparatus;
   (d) shearing said fluidized particles at a relatively high rate of shear comprising a blade speed of greater than about 800 rpm and a blade tip speed of at least about 10 m/s and by causing particle-particle interaction, particle-mixing blade interaction and particle-solid fixture interaction to substantially remove the coating from the polymeric substrate; and at a shearing temperature of less than about 95° C. and produce cleaned polymeric particles; and
   (e) recovering the cleaned polymeric particles at a metals content of less than about 30 ppmw.

24. A process as defined in claim 23 wherein said optical media comprises compact disk, digital video disk or mixtures thereof.

25. A process as defined in claim 23 wherein said accelerant is present and is selected from the group consisting of carboxylic acids, carboxylic acid esters and mixtures thereof.

26. A process as defined in claim 25 wherein said accelerant comprises aqueous acetic acid.

27. A process as defined in claim 23 further comprising the step of recovering aluminum and/or gold from said optical media.

28. A process for demetallizing and removing a coating from an optical media polymeric substrate, said process comprising the steps of:
- (a) fragmenting said polymeric substrate into relatively small polymeric substrate particles;
- (b) delivering said polymeric substrate particles and a fluidizing medium comprising water and an accelerant selected from the group consisting of a carboxylic acid, a carboxylic acid ester and mixtures thereof at a polymeric substrate solids content ranging from about 50 to about 60 percent to a mechanical shearing apparatus equipped with a rotary blade;
- (c) fluidizing said polymeric substrate particles in said mechanical shearing apparatus;
- (d) shearing said fluidized particles at a relatively high rate of shear comprising a blade speed of greater than about 800 rpm and a blade tip speed of at least about 10 m/s and by causing particle-particle interaction, particle-mixing blade interaction and particle-solid fixture interaction to substantially remove the coating from the polymeric substrate; and at a shearing temperature of less than about 95° C. and produce cleaned polymeric particles; and
- (e) recovering the cleaned polymeric.

* * * * *